Nov. 21, 1950 H. W. MADISON 2,531,142

MASKING DEVICE

Filed Nov. 26, 1945

Inventor

*Hunter W. Madison*

Patented Nov. 21, 1950

2,531,142

UNITED STATES PATENT OFFICE 2,531,142

MASKING DEVICE

Hunter W. Madison, Washington, D. C.

Application November 26, 1945, Serial No. 630,738

2 Claims. (Cl. 283—1)

This invention relates to devices employed in reading or copying data such as statistics or other memoranda which are tabulated or recorded on lines or in columns. It has for its object to facilitate the reading of certain items of such data without confusion with other items.

This is done by placing a bar beside a line or column of data, the bar having masking members extending outward from its edge so as to mask or hide from view those areas of the data containing the items not wanted while leaving exposed to view those that are to be read or copied off. In one form of the device, which affords a conveniently handled and adjustable instrument, the bar is chosen of suitable length and cross section and is provided with movable clips having upper and lower leaves which grip the bar elastically, the lower leaf of each clip being extended beyond the edge of the bar so as to hide from view selected areas along the bar containing items that are to be omitted.

In the accompanying drawing:

Figure 1 is a view looking down on the device in this form, placed on a sheet of data, showing bar 4 with a number of clips with upper leaves 5 and lower extending leaves 6*a*, 6*b*, etc.

The same numerals refer to the same parts in the three figures.

Figure 1:
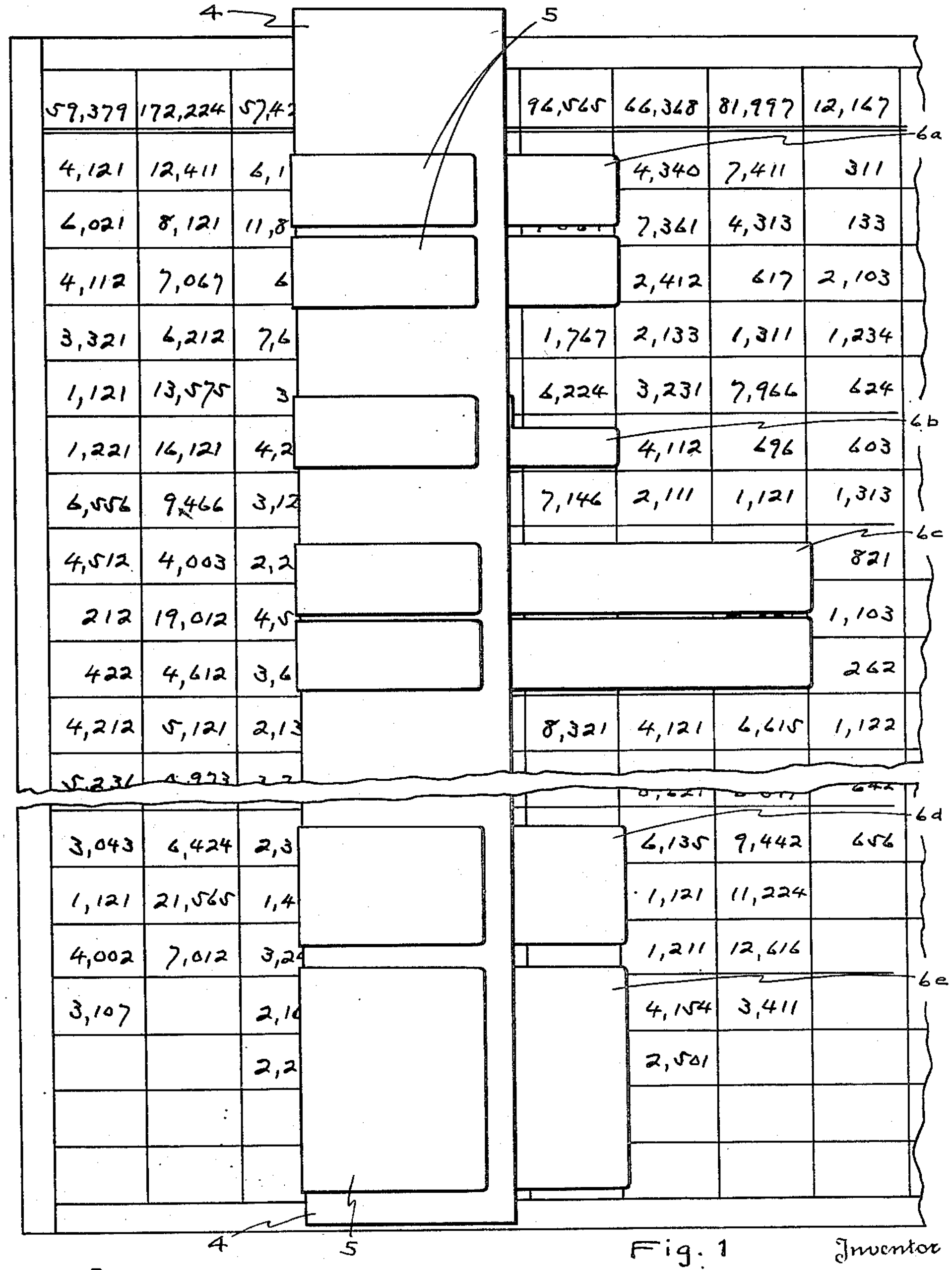
Figure 2:
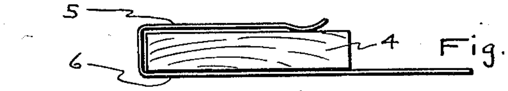
Figure 2 is an end view of bar 4 showing the manner of attaching movable clips of this form.

In Fig. 1 the data sheet and the device are broken, indicating that the device may be of indefinite length. As seen in the three figures the clips may be sprung on over the back edge of the bar and pushed into the desired positions for masking some areas and exposing others.

As here seen, the bar is placed for reading items from a sheet of data arranged in columns and has progressed to the sixth column from the left of the sheet. As shown, clips have been attached to the bar in such positions as to reveal the total at the head of the column and the items in lines 4, 5, 7 and 11. It is often desired to copy off in this manner the items in the same lines across a series of columns. It is only necessary then to move the bar from column to column across the sheet. By this means the reading of data may be more rapid and the operator is relieved of the uncertainty of making errors in reading or copying off the proper items.

Clips of various width and length may be provided, as indicated at 6*a*, 6*b*, 6*c*, etc., to serve the convenience of the operator. And it is obvious that the device may be of equal value for masking items in lines, in which case the bar will be laid horizontal and moved from line to line down the sheet with clips suitably spaced.

Figure 3:
Figure 3 is a modification of Fig. 2 as described below.

For securely holding the clips in alignment bar 4 may be provided with a longitudinal groove 7 as seen in Fig. 3. The upper leaf of the clip is then formed with a bead 8 to engage the groove.

The device is applicable to other uses than here described, such as finding averages and taking samples. The structure may be modified within the intended scope of the invention. That which is claimed is:

1. A masking device for facilitating the reading of tabulated data by hiding from view those items which are to be omitted, comprising a bar provided with a plurality of two-leaf spring clips of different widths, each having its lower leaf extended to project from the bar as a masking member, so that clips of different widths may be combined to get varied masking widths and these may be sprung onto the bar in chosen positions to get varied spacings between them to match the various widths and spacings found in tabulated data.

2. A masking device for facilitating the reading of tabulated data by hiding from view those items which are to be omitted, comprising a flat bar having a longitudinal groove in its upper face and a plurality of two-leaf spring clips engaging the bar, each having its lower leaf extended to project from the bar as a masking member and its upper leaf formed into an elongated bead engaging said groove to keep the lower leaf masking members in parallel alinement, so that these may be sprung onto the bar at varied spacings apart to match the various spacings found in tabulated data.

HUNTER W. MADISON.

REFERENCES CITED

The following references are of record in the file of this patent:

UNITED STATES PATENTS

| Number | Name | Date |
|---|---|---|
| 139,936 | Ward et al. | June 17, 1873 |
| 1,498,994 | Borsuk et al. | June 24, 1924 |
| 1,888,305 | Berger | Nov. 22, 1932 |
| 2,377,466 | Akker | June 5, 1945 |

FOREIGN PATENTS

| Number | Country | Date |
|---|---|---|
| 223,102 | Switzerland | Nov. 16, 1942 |
| 325,115 | Germany | Sept. 9, 1920 |